W. S. WALLACE.
FLY TRAP.
APPLICATION FILED DEC. 23, 1910.

1,017,027.

Patented Feb. 13, 1912.
2 SHEETS—SHEET 1.

WITNESSES

INVENTOR
W. S. Wallace,
BY
ATTORNEY

W. S. WALLACE.
FLY TRAP.
APPLICATION FILED DEC. 23, 1910.
1,017,027.
Patented Feb. 13, 1912.
2 SHEETS—SHEET 2.
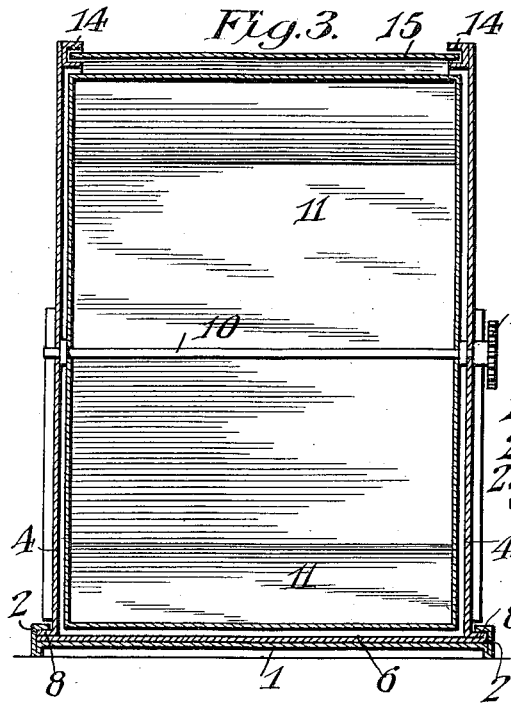
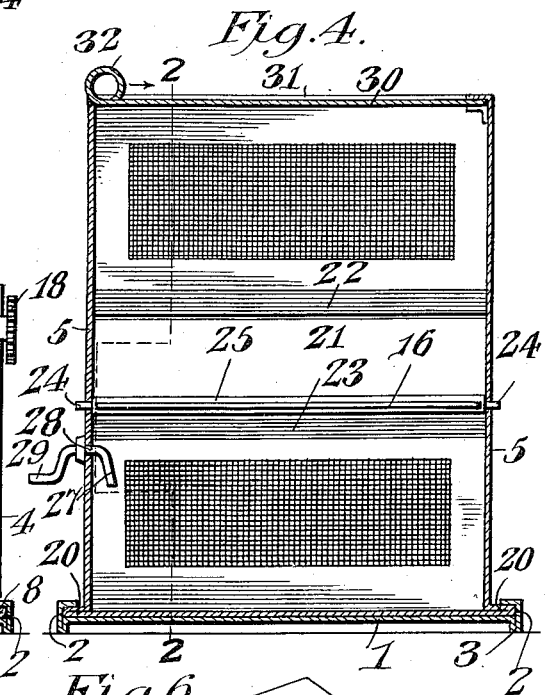
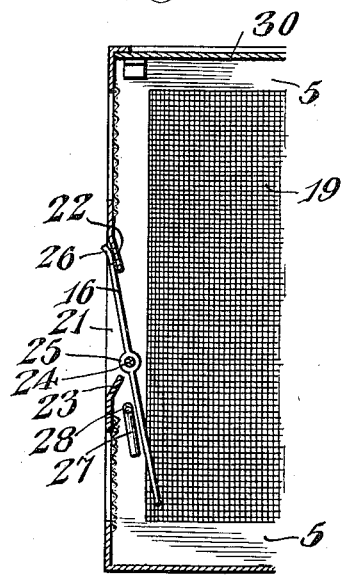
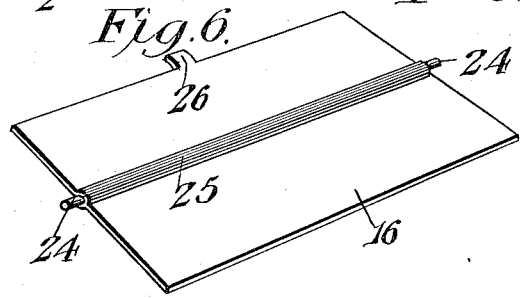
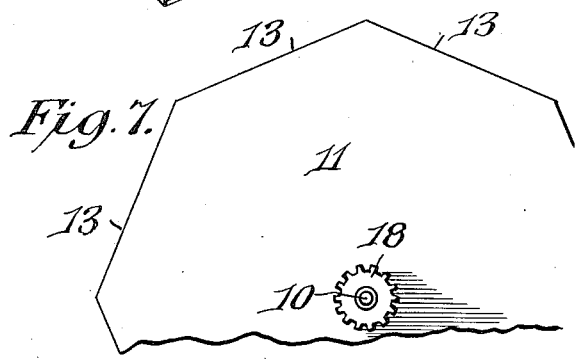
WITNESSES
Jas. K. McCathran
W. S. Wallace, INVENTOR
BY
ATTORNEY

UNITED STATES PATENT OFFICE.

WILLIAM SIMPSON WALLACE, OF SAN ANTONIO, TEXAS, ASSIGNOR OF ONE-HALF TO CASPER O. DALIET, OF AUSTIN, TEXAS.

FLY-TRAP.

1,017,027.      Specification of Letters Patent.      Patented Feb. 13, 1912.

Application filed December 23, 1910. Serial No. 598,980.

*To all whom it may concern:*

Be it known that I, WILLIAM SIMPSON WALLACE, a citizen of the United States, residing at San Antonio, in the county of Bexar and State of Texas, have invented a new and useful Fly-Trap, of which the following is a specification.

The invention relates to improvements in fly traps.

The object of the present invention is to improve the construction of fly traps, and to provide a simple, inexpensive and efficient fly trap, adapted to hold a bait for attracting flies, and equipped with means for caging the same, and permitting of the insects being easily destroyed when a sufficient number have been captured.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
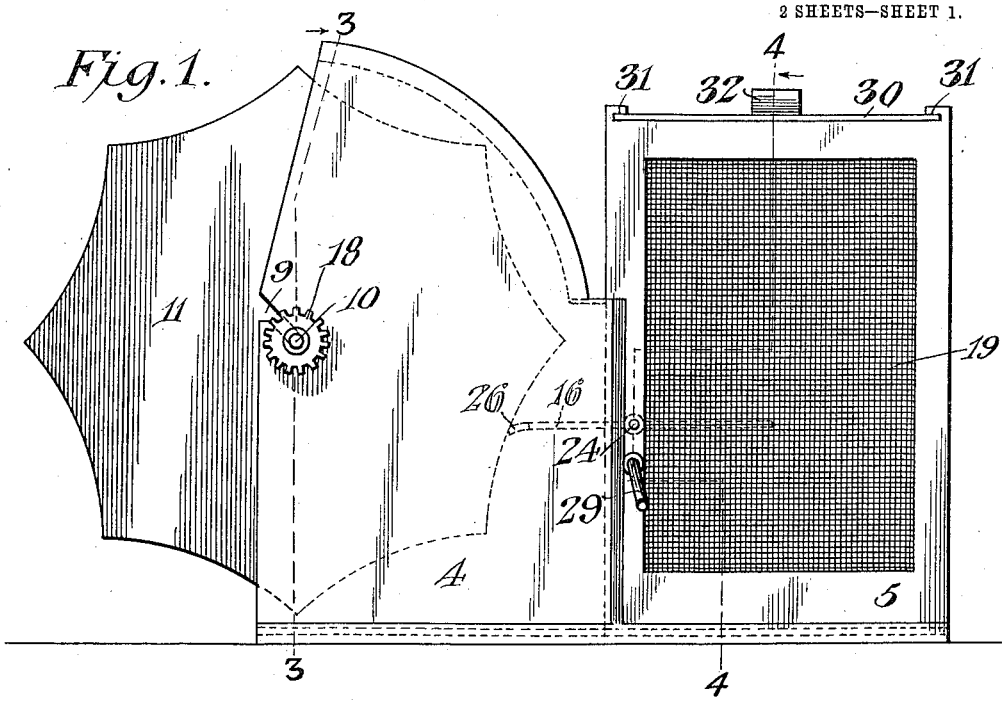
Figure 2:
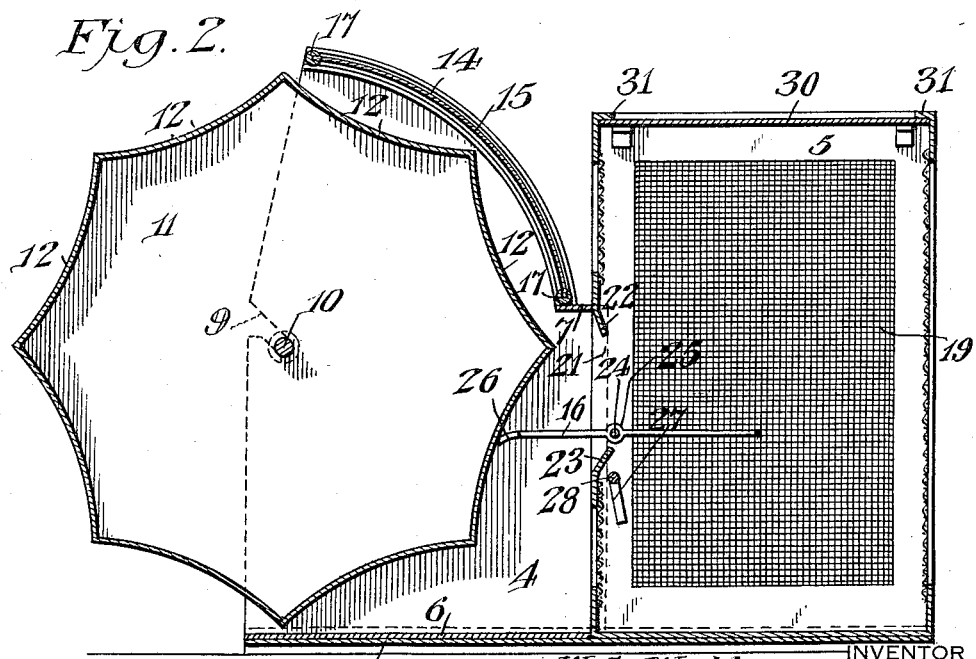

In the drawings:—Figure 1 is a side elevation of a fly trap, constructed in accordance with this invention. Fig. 2 is a vertical longitudinal sectional view on the line 2—2 of Fig. 4. Fig. 3 is a transverse sectional view on the line 3—3 of Fig. 1. Fig. 4 is a transverse sectional view on the line 4—4 of Fig. 1, the scraper being shown in elevation. Fig. 5 is a detail sectional view of the inner end of the cage, the scraper being arranged to close the opening thereof. Fig. 6 is a detail perspective view of the scraper. Fig. 7 is a detail view of another form of the bait drum.

Like numerals of reference designate corresponding parts in all the figures of the drawings.

In Figs. 1 to 6 inclusive in which is illustrated the preferred embodiment of the invention, 1 designates a base, constructed of sheet metal, or other suitable material, and provided at opposite sides with grooves or ways 2, preferably formed by bending the sheet metal downwardly to form depending supporting ribs or flanges 3 and then upwardly to a point above the plane of the body portion of the base and then inwardly over the same to provide the said grooves or ways 2, which are adapted to receive detachably a frame or casing 4 and a cage 5. The frame or casing 4, which is also preferably constructed of sheet metal, comprises in its construction a horizontal bottom 6, spaced parallel vertical sides, and a transversely disposed connecting rear portion 7, arranged horizontally and located at the inner or rear edges of the sides or walls of the casing, and arranged at a point intermediate of the top and bottom thereof. The sheet metal is extended outwardly at the side edges of the bottom 6, and is then bent inwardly on itself to provide horizontal laterally extending flanges 8, which project from the lower edges of the sides of the frame or casing and slidably fit in the grooves or ways 2 of the casing, whereby the frame or casing is retained thereon in interlocked relation therewith. The sides of the casing are provided at their front edges with inclined bearing slots 9, located at a point midway between the top and bottom of the frame or casing, and detachably receiving a horizontal shaft 10 of a rotary polygonal bait carrying drum 11, provided at its periphery with eight concave bait receiving faces 12, but the number of bait receiving faces may be varied and the drum may also be provided with straight bait receiving faces 13, as illustrated in Fig. 7 of the drawings. The upper edges of the sides of the casing 4 are arcuate, and are curved downwardly and rearwardly, and are provided at their inner faces with grooves or ways 14, preferably consisting of separate strips of sheet metal, and bent to form grooves or ways and suitably secured to the inner faces of the sides of the casing and extending downwardly and rearwardly to the upper face of the transverse connecting portion 7. These grooves or ways receive a transparent arcuate top wall 15, constructed of isinglass, or other suitable transparent material, and arranged above the rear or inner half of the drum and presenting an inner concave face to the same. The transverse edges or corners formed by the concave angularly related bait receiving faces 12 of the periphery of the drum closely approach the inner face of the transparent top wall 15 in the rotary movement of the drum, in order to confine the flies attracted by the bait on the drum in the spaces between the concave faces and the said transparent wall, whereby the flies will be prevented from escaping and will be conveyed to and caused to enter the cage 5, which is equipped with a scraper 16 for removing the flies from the faces of the drum. The transverse edges of the transparent top wall are preferably reinforced by transverse binding strips 17, designed to be either made of transparent material or be constructed as small as possible and given a light color, in order to avoid frightening the flies from the drum as they pass beneath the transparent top wall. The horizontal rear connecting portion 7 of the casing extends from the lower edge of the transparent top wall to the cage and closes the casing and prevents the escape of the flies at that point.

The shaft 10 of the rotary drum is provided with a gear wheel 18, designed to mesh with a gear wheel of a spring motor, or other suitable actuating device (not shown), which is designed to impart to the drum a relatively slow rotary movement, whereby the flies will be carried beneath the transparent top wall and conveyed to the cage without disturbing them. The periphery of the rotary drum may be supplied with any suitable bait for attracting flies to its peripheral faces, and it may be readily removed from the frame or casing for cleaning it, applying bait thereto, or for any other purpose.

The cage 5, which is preferably rectangular, has walls 19 of woven wire, supported by a metallic frame-work, and the cage is provided at the bottom with laterally extending horizontal flanges 20, slidably interlocked with the grooves or ways 2 of the base and preferably formed by extending the sheet metal of the frame-work outwardly and bending it back on itself, as shown, but any other construction of flange may be employed. The inner side or wall of the cage adjacent to the casing 4 is provided at an intermediate point between the top and bottom of the cage with a transverse opening 21, forming a fly inlet, and the said inner wall or cage is provided at the fly inlet with upper and lower transverse flanges 22 and 23. The upper flange 22, which is arranged contiguous to the horizontal transverse connecting portion 7, when the parts of the cage are assembled, extends downwardly and inwardly into the cage and is adapted to form an abutment for the scraper 16, which is pivoted adjacent to the lower flange 23 by the transverse rod or pintle 24. The lower flange extends upwardly and inwardly and the scraper, which preferably consists of a rectangular piece of sheet metal, is provided at one side of the center with a transverse bead or casing 25 for the reception of the pintle rod 24. The inner large portion of the scraper is heavier than the outer smaller portion, and is adapted to swing the scraper to the inclined position illustrated in Fig. 5 to close the inlet automatically when the scraper is free to oscillate on its pivot to this extent. The combined scraper and closure is provided at its outer edge with a central projecting spacing lug 26, which engages the periphery of the bait carrying drum and spaces the outer edge of the scraper from the same to prevent the outer edge of the scraper from scraping the bait from the drum. The outer edge of the scraper is arranged sufficiently close to the periphery of the drum to scrape the flies therefrom and to cause the insects to enter the cage, and it prevents the flies from escaping at the bottom of the drum. The scraper when in operative position with relation to the drum, as illustrated in Fig. 2 of the drawings, is arranged in a horizontal or substantially horizontal position, and as the drum revolves it is adapted to oscillate on its pivot to permit the concave bait receiving faces to pass its outer portion.

The cage is provided at a point below the pivot of the scraper with an oscillatory arm 27, connected with a suitable pivot 28 and operated by an exterior arm or handle 29. The pivot 28 pierces one of the side walls of the cage, and the arm 27 is adapted to be sprung upward to support the scraper in a horizontal position to enable it to be maintained in such open position, while the cage is being placed in position on the base 1. After the cage is placed in position, the oscillatory arm 27 is swung downwardly out of the way so as to leave the scraper free, and the heavier or weighted inner portion thereof will maintain the lug 26 in contact with the rotary drum. Any suitable means may be provided for engaging the exterior operating arm or handle 29 to lock the arm 27 at any adjustment.

The cage is provided with a slidable top or cover 30 having its side edges arranged in suitable grooves or ways 31 of the frame of the cage and provided with a suitable handle or pull 32, and adapted to be opened to afford access to the interior of the cage. When the cage is removed the flies may be easily destroyed, and if desired a cage having imperforate walls may be employed, and any suitable means may be placed within the cage for destroying the flies as they are captured.

Having thus fully described my invention, what I claim as new and desire to secure by Letters Patent, is:—

1. A trap of the class described including a casing open at the front and composed of spaced sides having inclined upper edges, an inclined transparent top connecting the upper edges of the sides and extending upwardly and forwardly from the top of the rear opening to the top of the front opening of the casing, a cage fitted against the casing at the back thereof and partially closing the rear opening of the same and having an opening communicating with the interior of the casing, a rotary bait carrying drum mounted between the sides of the casing and adapted to carry insects from the front of the casing through the latter to the opening of the cage, and a scraper mounted at the lower portion of the rear opening of the casing to remove insects from the drum and forming a closure for the opening of the cage when the latter is removed from the casing.

2. A trap of the class described including a cage having an opening, a bait carrying drum arranged to convey insects to the opening, and a scraper movably mounted at the opening and arranged to remove the insects from the drum, said scraper being also movable to a position across the opening of the cage and forming a closure for the same.

3. A trap of the class described including a removable cage provided with an entrance opening, a rotary bait carrying drum arranged adjacent to the opening of the cage, and a scraper pivotally mounted on the cage at the entrance opening thereof and adapted to scrape the insects from the drum and arranged to swing across the opening of the cage to form a closure for the same when the cage is removed.

4. A trap of the class described including a removable cage provided with an entrance opening, a rotary bait carrying drum arranged adjacent to the opening of the cage, and a scraper consisting of a plate pivoted at one side of the center to the cage and located at the entrance opening thereof and arranged to extend through the same, the inner portion of the scraper being heavier than the outer portion and adapted to maintain the scraper in coöperative relation with the drum and to swing the scraper automatically to a position across the opening of the cage when the scraper is free to close.

5. A trap of the class described including a removable cage provided with an entrance opening, a rotary bait carrying drum arranged adjacent to the opening of the cage, and a scraper consisting of a plate pivoted at one side of the center to the cage and located at the entrance opening thereof and arranged to extend through the same, the inner portion of the scraper being heavier than the outer portion and adapted to maintain the scraper in coöperative relation with the drum and to swing the scraper automatically to a position across the opening of the cage when the scraper is free to close, and an operating device having an arm or portion arranged to engage the weighted inner portion of the scraper to open the latter and to support the same in an open position.

6. A trap of the class described including a cage having an opening, a rotary bait carrying drum arranged adjacent to the opening, a scraper pivotally mounted at the opening and extending through the same and adapted to scrape insects from the drum, said scraper having a weighted inner portion adapted to swing the lever across the opening of the cage when the scraper is free to close, and a pivoted operating device having inner and outer arms, the inner arm being arranged to engage and open the scraper and the outer arm forming an operating handle.

7. A trap of the class described including a rotary bait carrying drum, a cage provided adjacent to the drum with an opening and having inwardly inclined flanges at the top and bottom of the opening, and a scraper pivotally mounted within the cage contiguous to the lower flange thereof and arranged to swing flat against the upper flange to form a closure for the opening.

In testimony, that I claim the foregoing as my own, I have hereto affixed my signature in the presence of two witnesses.

WILLIAM SIMPSON WALLACE.

Witnesses:
  M. F. Beaulac,
  I. T. Pryor.

---

Copies of this patent may be obtained for five cents each, by addressing the "Commissioner of Patents, Washington, D. C."